Jan. 18, 1966  G. H. BAUERLEIN  3,230,434
MOTOR FITTED WITH HALL GENERATOR AND
SEMI-CONDUCTOR CONTROLS

Filed Sept. 18, 1962  2 Sheets-Sheet 1

GERHARD H. BAUERLEIN
INVENTOR.

BY S. A. Giarratana
George B. Oujevolk
attorneys

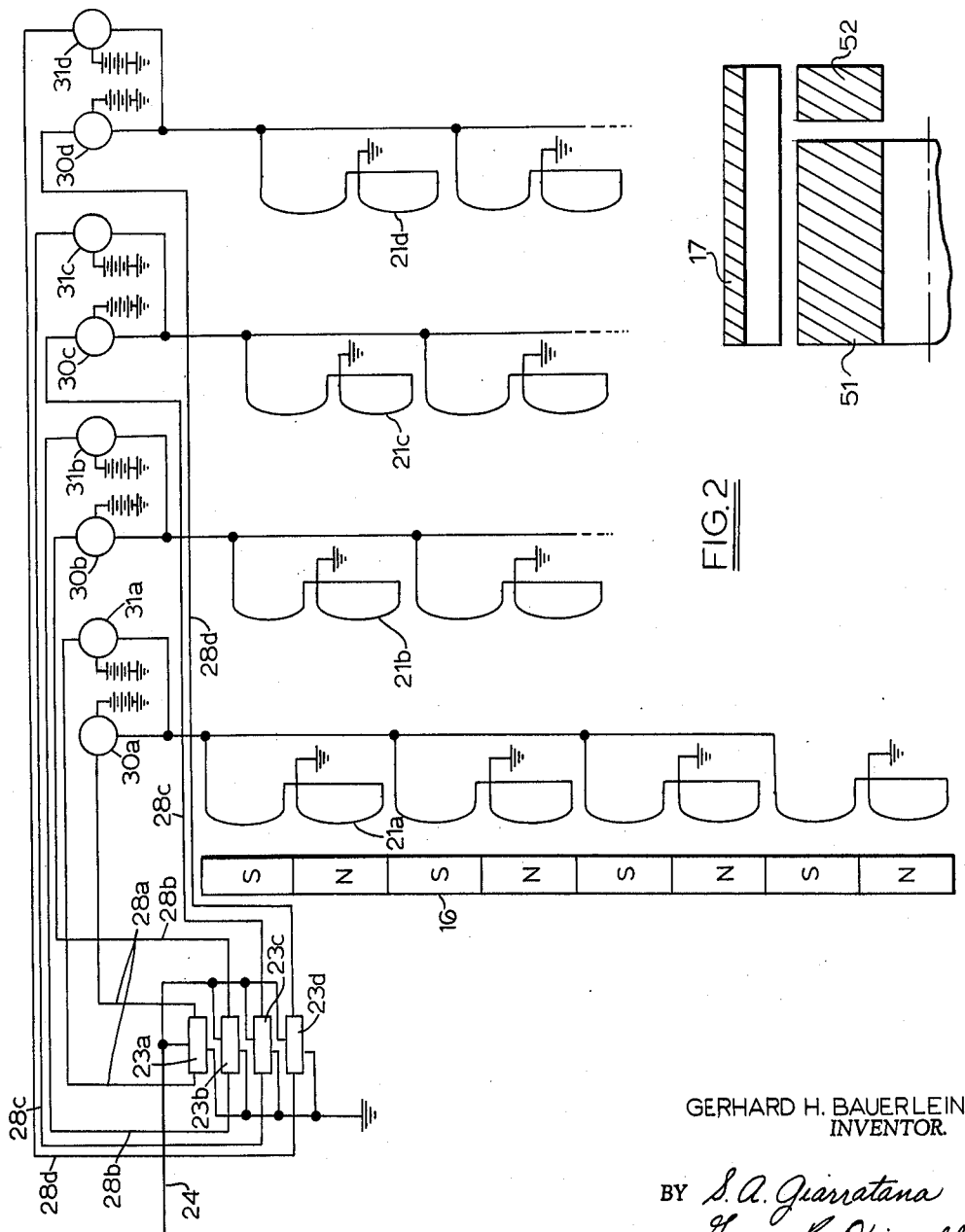

United States Patent Office 3,230,434
Patented Jan. 18, 1966

3,230,434
MOTOR FITTED WITH HALL GENERATOR AND SEMICONDUCTOR CONTROLS
Gerhard H. Bauerlein, Passaic, N.J., assignor to General Precision Inc., Little Falls, N.J., a corporation of Delaware
Filed Sept. 18, 1962, Ser. No. 224,382
5 Claims. (Cl. 318—138)

This invention relates to D.C. motors and is particularly directed to a D.C. motor, in which the conventional commutator and brushes are eliminated, and replaced by Hall generators, and pairs of electronic switching devices which may be transistors or control diodes.

This application is a continuation-in-part of the now abandoned co-pending application Serial No. 91,484 of Gerhard H. Bauerlein, entitled D.C. Motor Fitted With Hall Generator and Semiconductor Controls, and filed on February 24, 1961.

This device is an improvement on co-pending application, filed in the United States Patent Office by Ziemowit R. S. Ratajski on the 19th day of September 1960, Serial No. 56,795, now United States Patent No. 3,083,314, and directed to a D.C. Motor Fitted With Hall Generator.

In operation of the conventional type of D.C. motor some of the primary problems encountered are the difficulties caused by the combination of the brush contact commutator, and the brushes used in conjunction therewith. The conventional brush commutator tends to increase motor failures, and therefore affects the reliability of the motor and shortens its operating life. By replacing the conventional type of brush commutator with Hall generator devices, which perform the essential functions of the commutator, all sliding brush contacts are eliminated, thereby reducing wear to a minimum and enhancing the reliability of the motor.

Some of the problems encountered in utilizing a D.C. motor equipped with the conventional type of brush commutator are that the commutator limits the life of the apparatus by causing mechanical wear, reduces reliability, causes arcing, particularly under high altitude conditions, generates radio noise, and causes the motor to have a high static friction level.

The primary feature of the invention is the elimination of commutator, brushes by the use of a combination of a plurality of Hall generator crystals and pairs of transistors or controlled rectifiers as electronic switching devices or triggering means.

Another feature of the invention is the mounting of a plurality of segments or poles, each representing a part of a permanent magnet on the rotor of the device, the Hall generator crystals being located adjacent the permanent magnet segments.

Further objects and advantages of the present invention will become readily apparent as the following detailed description of the invention unfolds, and when taken in conjunction with the accompanying drawings, wherein:

FIGURE 2 is a developed schematic front elevational view of the motor shown in FIGURE 1, illustrating a development of the permanent magnet poles, the Hall generator crystals, and the circuit connecting the Hall generator crystals to pairs of electronic switching devices.

FIGURE 4 is a schematic longitudinal section through an embodiment of the D.C. motor shown in FIGURE 1, showing an arrangement of the Hall generator crystals, relative to the permanent magnet segments.

Figure 1:
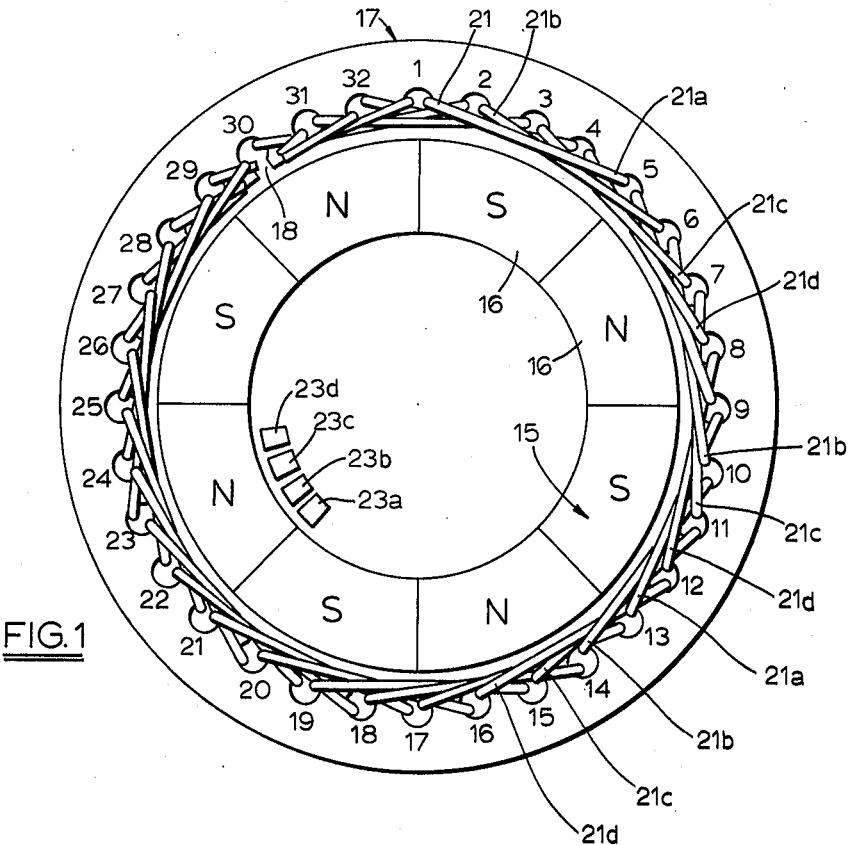
FIGURE 1 is a schematic side elevational view of one embodiment of the D.C. motor, showing the rotor including an annulus divided into segmental permanent magnet poles, the stator having axially extending slots distributed around the permanent magnet poles, and the stator coils wound in selected slots in the stator.

It will be understood that the following description of the construction and the method of wiring, operation and utilization of the D.C. motor fitted with Hall generator crystals, and semi-conductor controls is intended as explanatory of the invention and not restrictive thereof. One embodiment of the construction shown in FIGURES 1 and 2, comprises a substantially annular rotor 15 angularly divided into segments 16, each segment comprising a permanent magnet pole on the outer periphery of the rotor with alternate segments being opposite poles. An annular stator 17, coaxial with the rotor, surrounds the outer periphery of the rotor 15. The stator has a plurality of axially extending slots 18, angularly spaced around the inner periphery thereof, the number of slots being co-ordinated with the number of poles or segments 16 of the rotor. In the construction shown in FIGURE 1, there are 8 segments 16. There are four radial slots in the stator for each magnetic pole thus making a total of 32 slots. To facilitate the description the slots are numbered consecutively 1 to 32. A winding 21 is wound through the slots 18. The winding 21 comprises a plurality of overlapping coils, i.e., turns, four for each segment 16, with each turn occupying a different angular position about the axis of the rotor. Preferably, each turn is wound through two slots and spans an angle about the axis of the rotor equal to the angle spanned by each segment 16 of the rotor to form a full pitch winding arrangement; a fractional pitch winding arrangement can also be used. In the specific arrangement shown in FIGURE 1 the fact that there are four slots for each segment 16 means that the two slots in which a turn is wound are spaced apart by three intervening slots. The turns of the winding 21 are divided into four sets 21a, 21b, 21c and 21d. The turns of any given set span adjacent non-overlapping angles with the adjacent turns of the set having the conductors defining their adjacent sides lying in the same slot. Thus, in the embodiment of FIGURE 1 the set of turns 21a comprises a turn lying in slots 1 and 5, a turn lying in slots 5 and 9, a turn lying in slots 9 and 13, a turn lying in slots 13 and 17, a turn lying in slots 17 and 21, a turn lying in slots 21 and 25, a turn lying in slots 25 and 29, and a turn lying in slots 29 and 1. The sets of turns 21b is wound in slots 2, 6, 10, 14, 18, 22, 26 and 30; the set of turns 21c in slots 3, 7, 11, 15, 19, 23, 27 and 31; and the sets of turns 21d in slots 4, 8, 16, 20, 24, 28 and 32 in the same manner that the set of turns 21a is wound in its slots. The turns of any given set have their energization commonly controlled in such a manner that the adjacent turns of a set will always be energized with the opposed polarity. Each set of turns is displaced from its two adjacent set of turns by a fraction of the angle spanned by one segment 16. This fraction is equal to the inverse of the number of sets of turns and in the embodiment of FIGURE 1 is one fourth. A Hall generator is provided to control the energization of each set of turns 21a through 21d. Thus in the embodiments of FIGURES 1 and 2 there are four Hall generators, which are designated by the reference numbers 23a through 23d and which control energization of the sets of turns 21a through 21d respectively. The Hall generators 23a through 23d are part of or are fixed to the stator and are positioned adjacent the inner side of the annulus comprising the segments 16. The Hall generators are thus positioned in the magnetic field generated by the segments 16 and will have magnetic flux applied thereto alternating in directions as the rotor rotates. FIGURE 1 illustrates how the Hall generators 23a through 23d are angularly positioned with respect to the segment 16.

As shown in FIGURE 2 a D.C. voltage applied to a lead 24 is connected across the input terminals of the Hall generators 23a through 23d in parallel causing current to flow in each of these Hall generators in a direction perpendicular to the applied flux. The Hall generator will produce an output signal voltage proportional to the intensity of the applied magnetic field across their output terminals, which are positioned on axes perpendicular to the direction of current flow through the Hall generators and to the direction of the applied flux. The polarity of the output voltage produced by each of the Hall generators will depend upon the direction of the flux applied to the Hall generators and thus each of the Hall generators will alternately reverse the output signal voltage produced thereby as the segments 16 rotate past. The output signal voltage produced by the Hall generator 23a is applied across a pair of leads 28a to electronic switching devices 30a and 31a. The electronic switching devices 30a and 31a in response to the signal voltage from the Hall generator 23a controls the energization of the set of turns 21a. When a signal of one polarity is received from the Hall generator 23a, the switching device 31a will connect a positive voltage across the turns of the set 21a while the switching device 30a in response to a signal of this polarity will block the voltage from a negative source from the turns of the set 21a. When the polarity of the output voltage of the Hall generator 23a is reversed as a result of the magnetic flux applied to the Hall generator 23a being reversed, the electronic switching device 31a will block the positive source from the turns of the set 21a and the switching device 30a will connect the negative source of power across the turns of the set 21a. As a result the current flow through the turns of the set 21a will reverse as the magnetic flux applied to the Hall generator 23a reverses. The output signal voltage from the Hall generator 23b is applied to electronic switching devices 30b and 31b to control the energization of the turns of the set 21b in the same manner so that the current flow through the turns of the set 21b reverses as the flux through the Hall generator 23b reverses with the rotation of the rotor. Likewise the output signal voltages from the Hall generators 23c and 23d are applied to the electronic switching devices 30c and 31c and the electronic switching devices 30d and 31d respectively to control the energization of the turns of the sets 21c and 21d respectively in the same manner, so that the current flow through the turns of these sets reverses with the reversal of the flux applied to the Hall generators 23c and 23d. As a result the current flow through each set of turns 21a through 21d reverses as the rotor rotates, with a reversal of current flow in each set of turns occurring as each segment 16 rotates past the Hall generator controlling the energization of such set of turns. The Hall generators 23a through 23d are positioned with respect to the angular positions of the sets of turns 21a through 21d respectively so that when the turns of a set are aligned with the magnetic poles defined by the segments 16, the corresponding Hall generator controlling the energization of this set of turns will be between two poles. Thus the current flow through each set of turns will reverse precisely when the segments 16 come into position precisely centered underneath the turns of such set. Upon this reversal of current the magnetic field set up by the current flow through the turns will be in opposition to the magnetic field generated by the permanent magnetic poles of the segments 16. FIGURE 1 illustrates the angular position of the Hall generators 23a through 23d with respect to the sets of turns 21a through 21d required to achieve this result.

With this arrangement each set of turns will be generating a magnetic field which coacts with the magnetic poles of the segments 16 to cause the segments 16 and the rotor to rotate in one direction. As the rotor rotates, the current flow through the sets of turns 21a through 21d will reverse in sequence, with a reversal through a set of turns occurring for each increment of rotation through an angle equal to a fourth of a segment 16. This action maintains the direction of current flow through the sets of turns always in a direction to sustain the rotation. For example, when the rotor 15 is in the position shown in FIGURE 1, the current flow through the turn in slots 1 and 5 will just be reversing to oppose the flux generated by the magnetic pole in the segment 16 opposite this turn. Similarly the current flow through the remaining turns of the set 21a will just be reversing to oppose the flux generated by the magnetic poles in the segments opposite them. The current flow through the turn of set 21b lying in slots 2 and 6 will be in a direction to generate a magnetic field in the same direction as that which will be generated by the current flow in the turn in slots 1 and 5 after it reverses and thus this turn will interact with the flux generated by the permanent magnet poles to tend to cause the rotor 15 to rotate in a counterclockwise direction. Likewise the current flowing in the remaining turns of the set 21b will interact with the magnetic flux generated by the permanent magnet poles to cause the rotor 15 to rotate in a counterclockwise direction. The turn of the set 21c lying in slots 3 and 7 will also generate flux in the same direction as the turn of set 21b lying in slots 2 and 6 and thus will also interact with the flux generated by the segments 16 to drive the rotor 15 in a counterclockwise direction and the remaining turns of the set 21c will also be energized in a direction to drive the rotor 15 in this direction. Likewise the turn of the set 21d lying in slots 4 and 8 will be energized in the same direction as the turn of set 21b lying in slots 2 and 6 and therefore will drive the rotor 15 in a counterclockwise direction as will the remaining turns of the set 21d. When the rotor 15 is rotated through an angle equal to one quarter of a segment 16, the segments 16 will become centered under the turns of the set 21d and thus, the flux generated by the turns of the set 21d would be in the same direction as the flux generated by the poles in the segments 16 and would oppose further rotation of the rotor 15. However, at this time the flux through the Hall generator 23d reverses and as a result the current flow through the set of turns 21d reverses and as the rotor 15 continues to rotate the current in the set 21d will be in a direction to drive the rotor in a counterclockwise direction. Similarly as the segments 16 become centered under the turns of the sets 21c and 21b as the rotor rotates in a counterclockwise direction, the current flow through these sets of turns will reverse to thus maintain the driving relationship between the flux generated by the turns of the winding 21 and the flux generated by the segments 16. In this manner the rotor 16 will be continuously driven in a counterclockwise direction by the energization of the turns of the winding 21. It will be noted that with this arrangement the winding 21 generates a magnetic field which rotates in synchronism with the rotor 15 and thus continuously will drive the rotor 15. Thus the energization of the winding 21 is controlled to provide continuous rotation of the rotor without the use of a sliding brush commutator with its attendant disadvantages.

The turns of each set may be connected in parallel, as shown in FIGURE 2. For high impedance operation the turns of each set may be connected in series.

Figure 3:
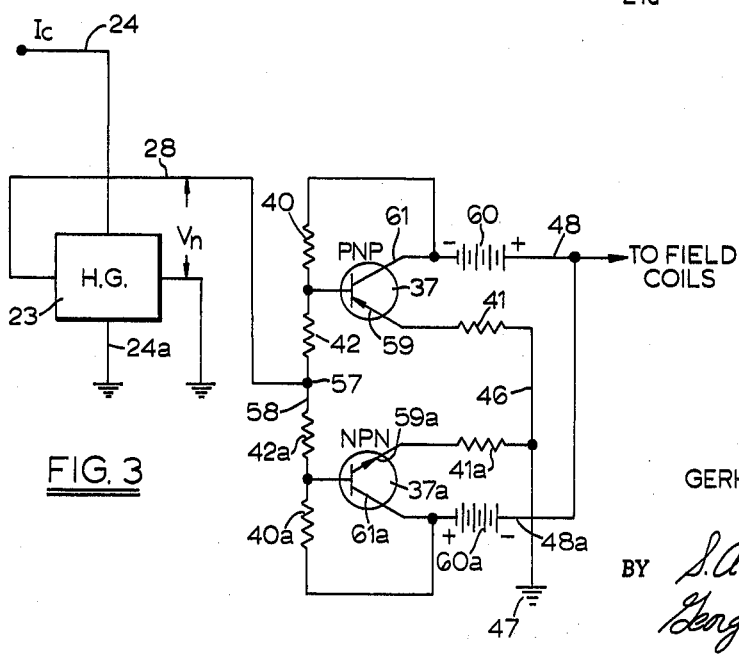
FIGURE 3 is a circuit diagram showing a pair of transistors connected as a pair of electronic switching devices for the circuit of FIGURE 2 and illustrating how the transistors are connected to a Hall generator.

FIGURE 3 shows a circuit diagram for a pair of the electronic switching devices. The output voltage from the Hall generator crystal 23 is fed through the lead 28 to a junction 57, and connecting lead 58, which is connected to the bases of a pair of PNP and NPN transistors 37 and 37a through resistors 42 and 42a respectively.

A resistor 40 is connected between the collector 61 and the base of the transistor 37 and a resistor 40a is connected between the collector 61a and the base of the transistor 37a. Resistors 42 and 42a, together with resistors 40 and 40a represent a biasing arrangement to provide amplification, reduce output distortion and increase linearity. A pair of resistors 41 and 41a are connected between the emitters 59 and 59a of the transistors and a lead 46, which is connected to ground at 47. A battery 60 has its negative terminal connected to the collector 61 of the PNP transistor 37 and its positive terminal connected to a lead 48. A battery 60a has its positive terminal connected to the collector 61a of the NPN transistor 37a and its negative terminal connected to the lead 48. The lead 48 is the output of the pair of switching devices and is connected to one set of turns. When the output voltage of the Hall generator 23 is of a polarity to make the lead 28 positive, the PNP transistor 37 will be cut off and the NPN transistor 37a will conduct. Thus the battery 60a will apply a negative voltage to the set of turns connected to the lead 48. Similarly if the Hall generator makes the lead 28 negative, the NPN transistor 37a will be cut off and the PNP transistor 37 will conduct. Thus the battery 60 will apply a positive voltage across the set of turns connected to the lead 48. In this manner each pair of switching devices reverse the current flow through the set of turns which it controls whenever the output voltage from the Hall generator to which it is responsive changes polarity.

FIGURE 4 illustrates an alternate disposition of the Hall generator crystals relative to the permanent magnet segments. In this construction, the Hall generator crystals 52, are located adjacent one side of the permanent magnet segment 51, the axial length of the permanent magnet segments being shorter than the stator 17, thus providing a clear area for the Hall generator crystals 52.

It is to be observed therefore that the present invention provides for a D.C. motor and includes, a rotor and a stator, said rotor having a plurality of permanent magnet poles angularly spaced about the axis thereof alternating in polarity, said stator comprising a plurality of Hall generators angularly spaced about the axis of said rotor, each positioned to be acted upon by the magnetic field generated by said permanent magnet poles to produce an output signal voltage having a polarity depending upon the direction of flux applied thereto, a stator winding positioned to interact with the magnetic field generated by said permanent magnet poles comprising a plurality of sets of turns, one set for each of said Hall generators, and means for each of said sets of turns and its corresponding Hall generator to energize such set of turns in response to the output signal voltage of such Hall generator with a current flowing in a direction changing in accordance with the polarity of the output signal voltage from such Hall generator, said sets of turns being positioned relative to said Hall generators to generate a magnetic field rotating in synchronism with the rotor and leading the rotor by 90°, to drive said rotor.

Furthermore, the Hall generator crystals shown, sense the flux under only one pole of an "n" pole device. In practice, all Hall generators need not be placed under the same pole, since all poles are alike. It is only necessary to locate the Hall generators under the required portion of any one of the "n" poles. Likewise, the rotor need not be a permanent magnet. It may be any means which provides a magnetic field that is stationary with respect to the rotor and rotates with it.

Many modifications may be made to the above described specific embodiment of the invention without departing from the spirit and scope of the invention, which is defined in the appended claims.

What is claimed is:

1. A motor comprising:
   a ring-like rotor formed at least partially by a plurality of arcuate permanent magnet pole segments, alternating in polarity, each of said segments defining a preset angle;
   a plurality of overlapping stator coils positioned about said rotor so as to interact with the magnetic field generated, each coil having a set of turns, the individual turns of which span an angle in the path of rotation, the angle spanned by each of said turns not exceeding said preset angle, the turns in each same set being angularly displaced from the adjacent turns in the same set by about said preset angle, and being angularly offset from corresponding turns in one of the other coils by a fraction of said preset angle, the number of said coils corresponding to the denominator of said fraction;
   a Hall generator corresponding to each of said coils disposed about the axis of said rotor so as to be acted on by the magnetic field generated by said permanent magnet pole segments to produce an output voltage drop across said Hall generator having a polarity depending on the polarity of the particular rotor pole segment acting thereon at some particular instant, each Hall generator being displaced from the nearest turn of its corresponding coil by said fraction of said preset angle, and,
   electrical means interposed between said Hall generator and its corresponding coil to induce a voltage through said coil turns forming a magnetic field opposite in polarity to the pole segment causing the output voltage across said Hall generator, whereby, as a rotor pole segment passes over a Hall generator, a magnetic field of opposite polarity is generated in the stator turn located at said fraction of said preset angle away from the instantaneous position of said rotor pole segment, attracting said rotor pole segment thereto, said generated field in said overlapping turns moving from coil to coil in advance of said rotor segment poles as said rotor moves.

2. A motor as claimed in claim 1, said ring-like rotor being formed by a plurality of identical arcuate permanent magnet pole segments alternating in polarity.

3. A motor as claimed in claim 2, including stator winding slots, the number of slots corresponding to said fraction denominator multiplied by said number of pole segments, the turns in each coil being wound through two slots, spanning said preset angle.

4. A motor as claimed in claim 3, said Hall generators being more than two and arcuately grouped together in the vicinity of said rotor collectively spanning an angle slightly overlapping said preset angle so that one pole segment cannot cause a Hall voltage drop of the same polarity through all Hall generators at the same time.

5. A motor as claimed in claim 4, said electrical means including a source of D.-C. potential with positive and negative terminals, transistor switch means interposed between said D.-C. source and each of said coils, each transitior having a control base, and, circuit means between said transistor bases and said Hall generators supplying D.-C. potential in proper phase across said coils in response to a voltage drop of opposite phase generated across the Hall generator.

References Cited by the Examiner

UNITED STATES PATENTS

| | | | |
|---|---|---|---|
| 2,512,325 | 6/1950 | Hansen | 310—10.1 |
| 3,025,443 | 3/1962 | Wilkinson et al. | 318—138 |
| 3,159,777 | 12/1964 | Manteuffel | 318—138 |

MILTON O. HIRSHFIELD, *Primary Examiner.*

ORIS L. RADER, *Examiner.*

S. GORDON, *Assistant Examiners.*